(12) United States Patent
Veregin et al.

(10) Patent No.: US 7,547,499 B2
(45) Date of Patent: Jun. 16, 2009

(54) LOW MELT TONER

(75) Inventors: Richard P. N. Veregin, Mississauga (CA); Geurino G. Sacripante, Oakville (CA); Maria N. V. McDougall, Brulington (CA); Paul J. Gerroir, Oakville (CA); Enno E. Agur, Toronto (CA)

(73) Assignee: Xerox Corporation, Norwalk, CT (US)

( * ) Notice: Subject to any disclaimer, the term of this patent is extended or adjusted under 35 U.S.C. 154(b) by 286 days.

(21) Appl. No.: 11/615,056

(22) Filed: Dec. 22, 2006

(65) Prior Publication Data

US 2008/0153027 A1 Jun. 26, 2008

(51) Int. Cl.
 *G03G 9/087* (2006.01)
(52) U.S. Cl. ............. 430/109.1; 430/109.4; 430/137.14
(58) Field of Classification Search ............... 430/109.4, 430/137.14, 109.1
See application file for complete search history.

(56) References Cited

U.S. PATENT DOCUMENTS

| | | | |
|---|---|---|---|
| 5,512,401 A | 4/1996 | Sacripante et al. | |
| 5,916,996 A | 6/1999 | Sacripante et al. | |
| 6,359,105 B1 | 3/2002 | Ianni et al. | |
| 6,653,435 B1 | 11/2003 | Aoki et al. | |
| 6,780,557 B2 * | 8/2004 | Kawaji et al. | 430/109.3 |
| 6,830,860 B2 | 12/2004 | Sacripante et al. | |
| 6,841,329 B2 | 1/2005 | Nguyen et al. | |
| 2005/0136353 A1 * | 6/2005 | Sato et al. | 430/107.1 |
| 2005/0245694 A1 * | 11/2005 | Matsumura et al. | 525/437 |

* cited by examiner

*Primary Examiner*—John L Goodrow
(74) *Attorney, Agent, or Firm*—Oliff & Berridge, PLC

(57) ABSTRACT

A toner includes binder of amorphous polymer material, such as an amorphous polyester material, and a crystalline polymer material, such as a crystalline polyester material, wherein the amorphous polymer material has an acid number that is greater than an acid number of the crystalline polymer material. Further, the toner may have a minimum fusing temperature of from about 75° C. to about 150° C. and a relative humidity sensitivity of from about 0.5 to about 10. A method of making toner particles is also indicated.

20 Claims, No Drawings

LOW MELT TONER

BACKGROUND

Described herein are toners, and particularly emulsion aggregation toners. The toners exhibit a low melt temperature while simultaneously exhibiting excellent relative humidity sensitivity regarding charging properties. Also described are methods of making such toners.

Advantages of the toners described herein include, for example, the ability to incorporate crystalline materials into the toner to achieve low melting characteristics without sacrificing relative humidity sensitivity.

Low melting, including ultra low melting, toners are known. For example, such toners may be comprised of an amorphous polyester material having a crystalline polyester material mixed therein. The crystalline polyester material imparts the low melting temperature to the polyester toner. An example of such a low melting polyester toner is described in, for example, U.S. Pat. No. 6,830,860, incorporated herein by reference in its entirety.

However, addition of the crystalline polyester material to the amorphous polyester material may cause a lowering of the charging performance of the toner, particularly in higher temperature and/or higher humidity conditions. Thus, the low melting polyester toners may still be improved in terms of relative humidity sensitivity. The affect on relative humidity sensitivity may be because as the toner particles melt, for example during the toner particle formation process, the crystalline polyester material tends to migrate to the toner particle surface, where it crystallizes and may interfere with toner charging in high temperature and/or high humidity conditions.

Attempts to address this potential issue have included placing an additional shell of amorphous polyester material on the toner particle surface, thus covering any crystalline polyester material that may migrate toward the surface. However, it is not an easy procedure to locate the amorphous polyester shell upon the toner particle surface. Moreover, the shell must still be melted during the toner particle formation process, such as during coalescence of the toner particles following aggregation or formation, which again results in the same migration issues as when no shell is included.

SUMMARY

Thus, it is still desired to develop a toner that exhibits a desirably low melting property while also exhibiting excellent relative humidity sensitivity, that is, excellent charging in both low humidity and high humidity conditions.

These and other objects are achieved herein. In embodiments, described is a toner comprised of amorphous polymer material and crystalline polymer material, wherein the amorphous polymer material has an acid number that is greater than an acid number of the crystalline polymer material.

In further embodiments, described is a toner comprised of polymer binder, wherein the toner has a minimum fusing temperature of from about 75° C. to about 150° C. and a relative humidity sensitivity of from about 0.5 to about 10.

In still further embodiments, described is a method of making a toner comprised of binder comprising amorphous polymer material and crystalline polymer material, wherein the amorphous polymer material has an acid number that is greater than an acid number of the crystalline polymer material, the method comprising forming an aqueous emulsion of the amorphous polymer material and the crystalline polymer material, and aggregating toner particles from the aqueous emulsion.

EMBODIMENTS

The toners herein are low melt or ultra low melt toners. A low melt or ultra low melt toner typically has a glass transition temperature of from, for example, about 45° C. to about 85° C., such as from about 50° C. to about 65° C. or from about 50° C. to about 60° C. Such toners also exhibit a desirably low fixing or fusing temperature, for example a minimum fusing temperature of from about 75° C. to about 150° C., such as from about 80° C. to about 150° C. or from about 90° C. to about 130° C. Such low melt characteristics are desirable in enabling the toner to be fixed or fused onto an image receiving substrate such as paper at a lower temperature, which can result in energy savings as well as increased device speed.

In addition, the toner may have a relative humidity sensitivity of, for example, from about 0.5 to about 10, such as from about 0.5 to about 5. Relative humidity (RH) sensitivity is a ratio of the charging of the toner at high humidity conditions to charging at low humidity conditions. That is, the RH sensitivity is defined as the ratio of toner charge at 15% relative humidity and a temperature of about 12° C. (denoted herein as C-zone) to toner charge at 85% relative humidity and a temperature of about 28° C. (denoted herein as A-zone); thus, RH sensitivity is determined as (C-zone charge)/(A-zone charge). Ideally, the RH sensitivity of a toner is as close to 1 as possible, indicating that the toner charging performance is the same in low and high humidity conditions, that is, that the toner charging performance is unaffected by the relative humidity.

A toner having the above low melt/ultra low melt characteristics and RH sensitivity characteristics may be comprised of a binder comprising both an amorphous polymer material, such as a resin or polymer, and a crystalline polymer material, such as a resin or binder. It is desirable for the acid number of the amorphous polymer material to be greater than the acid number of the crystalline polymer material, as will be described below.

The toner may desirably be a polyester toner, comprised of both an amorphous polyester material, such as a resin or polymer, and a crystalline polyester material, such as a resin or binder.

As the amorphous polymer material, an amorphous polymer material having acid terminated chains (end groups) may be used. The acid terminated end groups impart an acid number to the amorphous polymer. The amorphous polymer may have an acid number of from about 13 to about 30, such as from about 16 to about 30 or from about 19 to about 30. The acid number of the polymer may be controlled by controlling the amount of acid monomers used in making the polymer, with the amount of acid monomers determining the acid number of the obtained polymer, for example as a result of controlling the extent of acid group terminated chains. The acid number may also be adjusted in the polymer by converting hydroxyl end groups to acid groups to raise the acid number or by converting acid end groups to hydroxyl end groups to lower the acid number.

Acid number represents the milligrams of potassium or sodium hydroxide required to neutralize the acidic constituents present in a 1 gram sample of the material. The material may be dissolved in an appropriate solvent, for example such as toluene and/or isopropanol, and titrated with the hydroxide.

Any amorphous polymer material with the desired amount of acid end groups may be used, for example such as polyesters, polyester-polyimides or polyimides such as described in U.S. Pat. Nos. 5,916,996 and 5,512,401, polyamides and the like. Specific examples of amorphous polyester materials that may be used include both branched and linear amorphous materials, and combinations of branched and linear amorphous materials. The amorphous polyester materials may be formed by the polycondensation of an organic alcohol such as a diol or glycol and an acid, including anhydrides, optionally with a multivalent polyacid or polyol as a branching agent, and a polycondensation catalyst. The amorphous polyesters may further be crosslinked, that is, may include crosslinked portions therein. Suitable acids may include, for example, succinic acid, glutaric acid, adipic acid, pimelic acid, suberic acid, azelaic acid, sebacic acid, isophthalic acid, terephthalic acid, hexachloroendo methylene tetrahydrophthalic acid, maleic acid, fumaric acid, chloromaleic acid, methacrylic acid, acrylic acid, itaconic acid, citraconic acid, mesaconic acid, maleic anhydride, phthalic anhydride, chlorendic anhydride, tetrahydrophthalic anhydride, hexahydrophthalic anhydride, endomethylene tetrahydrophthalic anhydride, tetrachlorophthalic anhydride, tetrabromophthalic anhydride, and the like and mixtures thereof. Suitable alcohols may include, for example, propylene glycol, ethylene glycol, diethylene glycol, neopentyl glycol, dipropylene glycol, dibromoneopentyl glycol, propoxylated bisphenol A, ethoxylated bisphenol A and other alkoxylated bisphenol A diols, 2,2,4-trimethylpentane-1,3-diol, tetrabromo bisphenol dipropoxy ether, 1,4-butanediol, and the like and mixtures thereof. Desirable amorphous polyester materials may be prepared from diacids and/or anhydrides such as, for example, maleic anhydride, fumaric acid, and the like and mixtures thereof, and diols such as, for example, propoxylated bisphenol A, propylene glycol, and the like and mixtures thereof. A poly (propoxylated bisphenol A fumarate) polyester is suitable.

The amorphous polyester may also be comprised of an alkali sulfonated polyester resin, such as the metal or alkali salts of copoly(ethylene-terephthalate)-copoly(ethylene-5-sulfo-isophthalate), copoly(propylene-terephthalate)-copoly (propylene-5-sulfo-isophthalate), copoly(diethylene-terephthalate)-copoly(diethylene-5-sulfo-isophthalate), copoly (propylene-diethylene-terephthalate)-copoly(propylene-diethylene-5-sulfoisophthalate), copoly(propylene-butylene-terephthalate)-copoly(propylene-butylene-5-sulfo-isophthalate), copoly(propoxylated bisphenol-A-fumarate)-copoly(propoxylated bisphenol A-5-sulfo-isophthalate), copoly(ethoxylated bisphenol-A-fumarate)-copoly(ethoxylated bisphenol-A-5-sulfo-isophthalate), and copoly(ethoxylated bisphenol-A-maleate)-copoly(ethoxylated bisphenol-A-5-sulfo-isophthalate), wherein the alkali metal is, for example, a sodium, lithium or potassium ion.

The amorphous polyester may include crosslinked portions therein, for example such that the toner has a weight fraction of the microgel (a gel content) in the range of, for example, from about 0.001 to about 50 weight percent, such as from about 0.1 to about 40 weight percent or from about 1 to about 10 weight percent, of the amorphous polyester. The gel content may be achieved either by mixing in an amount of crosslinked material, or crosslinking portions of the amorphous polyester, for example by including a crosslinking initiator in the amorphous polyester. The initiators may be, for example, peroxides such as organic peroxides or azo-compounds, for example diacyl peroxides such as decanoyl peroxide, lauroyl peroxide and benzoyl peroxide, ketone peroxides such as cyclohexanone peroxide and methyl ethyl ketone, alkyl peroxy esters such as t-butyl peroxy neodecanoate, 2,5-dimethyl 2,5-di(2-ethyl hexanoyl peroxy)hexane, t-amyl peroxy 2-ethyl hexanoate, t-butyl peroxy 2-ethyl hexanoate, t-butyl peroxy acetate, t-amyl peroxy acetate, t-butyl peroxy benzoate, t-amyl peroxy benzoate, oo-t-butyl o-isopropyl mono peroxy carbonate, 2,5-dimethyl 2,5-di (benzoyl peroxy)hexane, oo-t-butyl o-(2-ethyl hexyl) mono peroxy carbonate, and oo-t-amyl o-(2-ethyl hexyl) mono peroxy carbonate, alkyl peroxides such as dicumyl peroxide, 2,5-dimethyl 2,5-di(t-butyl peroxy)hexane, t-butyl cumyl peroxide, bis(t-butyl peroxy)diisopropyl benzene, di-t-butyl peroxide and 2,5-dimethyl 2,5-di(t-butyl peroxy)hexyne-3, alkyl hydroperoxides such as 2,5-dihydro peroxy 2,5-dimethyl hexane, cumene hydroperoxide, t-butyl hydroperoxide and t-amyl hydroperoxide, and alkyl peroxyketals such as n-butyl 4,4-di(t-butyl peroxy)valerate, 1,1-di(t-butyl peroxy) 3,3,5-trimethyl cyclohexane, 1,1-di(t-butyl peroxy)cyclohexane, 1,1-di(t-amyl peroxy)cyclohexane, 2,2-di(t-butyl peroxy)butane, ethyl 3,3-di(t-butyl peroxy)butyrate and ethyl 3,3-di(t-amyl peroxy)butyrate, azobis-isobutyronitrile, 2,2'-azobis(isobutyronitrile), 2,2'-azobis (2,4-dimethyl valeronitrile), 2,2'-azobis(methyl butyronitrile), 1,1'-azobis(cyano cyclohexane), 1,1-di(t-butyl peroxy)-3,3,5-trimethylcyclohexane, combinations thereof and the like. The amount of initiator used is proportional to the degree of crosslinking, and thus the gel content of the polyester material. The amount of initiator used may range from, for example, about 0.01 to about 10 weight percent, such as from about 0.1 to about 5 weight percent or the amorphous polyester. In the crosslinking, it is desirable that substantially all of the initiator be used up. The crosslinking may be carried out at high temperature, and thus the reaction may be very fast, for example, less than 10 minutes, such as from about 20 seconds to about 2 minutes residence time.

Branching agents to generate a branched amorphous polyester may include, for example, a multivalent polyacid such as 1,2,4-benzene-tricarboxylic acid, 1,2,4-cyclohexanetricarboxylic acid, 2,5,7-naphthalenetricarboxylic acid, 1,2,4-naphthalenetricarboxylic acid, 1,2,5-hexanetricarboxylic acid, 1,3-dicarboxyl-2-methyl-2-methylene-carboxylpropane, tetra(methylene-carboxyl)methane, and 1,2,7,8-octanetetracarboxylic acid, acid anhydrides thereof, and lower alkyl esters thereof having from about 1 to about 6 carbon atoms; a multivalent polyol such as sorbitol, 1,2,3,6-hexanetetrol, 1,4-sorbitane, pentaerythritol, dipentaerythritol, tripentaerythritol, sucrose, 1,2,4-butanetriol, 1,2,5-pentatriol, glycerol, 2-methylpropanetriol, 2-methyl-1,2,4-butanetriol, trimethylolethane, trimethylolpropane, 1,3,5-trihydroxymethylbenzene, mixtures thereof, and the like. The branching agent amount selected is, for example, from about 0.01 to about 10 mole percent of the polyester material, such as from about 0.05 to about 8 mole percent or from about 0.1 to about 5 mole percent of the polyester material.

The amorphous polymer may comprise, for example, from about 50 to about 95 percent by weight, such as from about 75 to about 95 percent by weight or from about 80 to about 90 percent by weight, of the binder. In embodiments, the amorphous polymer material, such as the amorphous polyester material, possesses, for example, a number average molecular weight ($M_n$), as measured by gel permeation chromatography (GPC), of from about 1,000 to about 500,000, such as from about 2,000 to about 250,000; a weight average molecular weight ($M_w$) of, for example, from about 1,000 to about 600,000, such as from about 2,000 to about 300,000, as determined by GPC using polystyrene standards; and a molecular weight distribution ($M_w/M_n$) of, for example, from about 1.5 to about 6, such as from about 2 to about 4.

The binder also includes a crystalline polymer material. As used herein, "crystalline" refers to, for example, a material with a three dimensional order, and encompasses both crystalline and semicrystalline materials. "Semicrystalline" refers to materials with a crystalline percentage of less than 100%, for example, from about 10 to about 60%. The polymer is considered crystalline when it is comprised of crystals with a regular arrangement of its atoms in a space lattice, and thus provides a defined melting point. An amorphous polymer, on the other hand, lacks such an organized crystalline structure and lacks a defined melting point.

The crystalline polymer material may be of the same kind as or different kind from the polymer of the amorphous polyester material. For example, both polymer materials may be of the same kind by both being polyester materials.

Any crystalline polymer material may be used, for example including polyesters, polyester-polyimides, polyimides, polyamides and the like. Desirably, a crystalline polyester material is used.

The crystalline polymer material also desirably includes acid terminated end groups. However, the acid number of the crystalline polymer, such as a crystalline polyester, should be less than the acid number of the amorphous polymer, such as an amorphous polyester. For example, the crystalline polymer material should have an acid number that is less than the acid number of the amorphous polymer material by a value of about 3 or more, such as by about 6 or more.

It appears that by increasing the acid number of the amorphous polymer material, the effect of the inclusion of the crystalline polymer material in tending to lower the charging level of the toner in high humidity conditions is lessened. It is believed that the higher acid number of the amorphous polymer provides a stronger interaction with the water phase for the amorphous polymer than the crystalline polymer. Thus, crystalline polymer, which has lower acid number, is less hydrophilic and has a lower ionic character, cannot displace amorphous polymer at the surface of the toner particles. However, any crystalline polymer that is at the surface can be displaced by the more hydrophilic amorphous polymer during formation of the particles, for example as the toner coalescence proceeds.

A crystalline polyester may be prepared by polycondensation of an organic alcohol such as diol or glycol and an organic diacid in the presence of a polycondensation catalyst. Additionally, in place of an organic diacid, an organic diester may also be selected, and where an alcohol byproduct is generated.

For example, the crystalline polyester may be obtained by polycondensing an alcohol component comprising 80% by mole or more of an aliphatic diol having 2 to 6 carbon atoms, such as 4 to 6 carbon atoms, with a carboxylic acid component comprising 80% by mole or more of an aliphatic dicarboxylic acid compound having 2 to 8 carbon atoms, such as 4 to 6 carbon atoms or 4 carbon atoms. See, for example, U.S. Pat. No. 6,780,557. The aliphatic diol having 2 to 6 carbon atoms may include ethylene glycol, 1,2-propylene glycol, 1,3-propylene glycol, 1,4-butanediol, 1,5-pentanediol, 1,6-hexanediol, neopentyl glycol, 1,4-butanediol, and the like. It is desirable that the aliphatic diol is contained in the alcohol component in an amount of about 80% by mole or more, such as from about 85 to 100% by mole. The alcohol component may also contain a polyhydric alcohol component other than the aliphatic diol having 2 to 6 carbon atoms. Such a polyhydric alcohol component includes a divalent aromatic alcohol such as an alkylene (2 to 3 carbon atoms) oxide adduct (average number of moles added being 1 to 10) of bisphenol A, such as polyoxypropylene(2.2)-2,2-bis(4-hydroxyphenyl) propane and polyoxyethylene (2.2)-2,2-bis(4-hydroxyphenyl)propane; a trihydric or higher polyhydric alcohol component such as glycerol, pentaerythritol and trimethylolpropane; and the like. The aliphatic dicarboxylic acid compound having 2 to 8 carbon atoms includes oxalic acid, malonic acid, maleic acid, fumaric acid, citraconic acid, itaconic acid, glutaconic acid, succinic acid, adipic acid, acid anhydrides thereof, alkyl (1 to 3 carbon atoms) esters thereof, and the like. It is desirable that the aliphatic dicarboxylic acid compound is contained in the carboxylic acid component in an amount of about 80% by mole or more, such as from about 85 to 100% by mole. Among them, from the viewpoint of the storage ability of the crystalline polyester, it is desirable that fumaric acid is contained in the carboxylic acid component in an amount of about 60% by mole or more, such as about 70 to 100% by mole. The carboxylic acid component may contain a polycarboxylic acid component other than the aliphatic dicarboxylic acid compound having 2 to 8 carbon atoms. Such a polcarboxylic acid component includes aromatic dicarboxylic acids such as phthalic acid, isophthalic acid and terephthalic acid; aliphatic dicarboxylic acids such as sebacic acid, azelaic acid, n-dodecylsuccinic acid and n-dodecenylsuccinic acid; alicyclic carboxylic acids such as cyclohexanedicarboxylic acid; tricarboxylic or higher polycarboxylic acids such as 1,2,4-benzenetricarboxylic acid (trimellitic acid) and pyromellitic acid; acid anhydrides thereof, alkyl (1 to 3 carbon atoms) esters thereof, and the like.

The crystalline polyester may also be derived from monomers containing an alcohol component such as a diol and/or comprising a trihydric or higher polyhydric alcohol, and an organic acid and/or a carboxylic acid component comprising a tricarboxylic or higher polycarboxylic acid compound as detailed in U.S. Pat. No. 6,653,435, incorporated herein by reference in its entirety. The trihydric or higher polyhydric alcohols include sorbitol, 1,2,3,6-hexanetetrol, 1,4-sorbitan, pentaerythritol, dipentaerythritol, tripentaerythritol, 1,2,4-butanetriol, 1,2,5-pentanetriol, glycerol, 2-methylpropanetriol, 2-methyl-1,2,4-butanetriol, trimethylolethane, trimethylolpropane, 1,3,5-trihydroxymethylbenzene, and the like. Examples of the tricarboxylic or higher polycarboxylic acid compound include 1,2,4-benzenetricarboxylic acid (trimellitic acid), 2,5,7-naphthalenetricarboxylic acid, 1,2,4-naphthalenetricarboxylic acid, 1,2,4-butanetricarboxylic acid, 1,2,5-hexanetricarboxylic acid, 1,3-dicarboxy-2-methyl-2-methylenecarboxypropane, 1,2,4-cyclohexanetricarboxylic acid, tetra(methylenecarboxyl)methane, 1,2,7,8-octanetetracarboxylic acid, pyromellitic acid, Empol trimer acid, acid anhydrides thereof, alkyl (1 to 3 carbon atoms) esters thereof, and the like.

The aforementioned crystalline polyester materials may be prepared by the polycondensation reactions described in the aforementioned patents.

In embodiments, the crystalline polyester material may be derived from a monomer system comprised of an alcohol selected from among 1,4-butanediol, 1,6-hexanediol, and mixtures thereof with a dicarboxylic acid selected from among fumaric acid, succinic acid, oxalic acid, adipic acid, and mixtures thereof. For example, the crystalline polyester may be derived from 1,4-butanediol and/or 1,6-hexanediol and fumaric acid, the polyester having a crystallinity of about 25 to about 75% such as from about 40 to about 60%.

Examples of organic diols include aliphatic diols with from about 2 to about 36 carbon atoms, such as 1,2-ethanediol, 1,3-propanediol, 1,4-butanediol, 1,5-pentanediol, 1,6-hexanediol, 1,7-heptanedioi, 1,8-octanediol, 1,9-nonanediol, 1,10-decanediol, 1,12-dodecanediol and the like; alkali sulfo-aliphatic diols such as sodio 2-sulfo-1,2-ethanediol, lithio 2-sulfo-1,2-ethanediol, potassio 2-sulfo-1,2-ethanediol, sodio 2-sulfo-1,3-propanediol, lithio 2-sulfo-1,3-propanediol, potassio 2-sulfo-1,3-propanediol, mixture thereof, and the like.

Examples of organic diacids or diesters selected for the preparation of the crystalline resins include oxalic acid, succinic acid, glutaric acid, adipic acid, suberic acid, azelaic acid, sebacic acid, phthalic acid, isophthaiic acid, terephthalic acid, naphthalene-2,6-dicarboxylic acid, naphthalene-2,7-dicarboxylic acid, cyclohexane dicarboxylic acid, malonic acid and mesaconic acid, a diester or anhydride thereof.

Generally, a stoichiometric equimolar ratio of organic diol and organic diacid is utilized. However, in some instances, wherein the boiling point of the organic diol is from about 180° C. to about 230° C., an excess amount of diol may be utilized and removed during the polycondensation process.

Polycondensation catalyst examples for either the crystalline or amorphous polyesters include tetraalkyl titanates, dialkyltin oxide such as dibutyltin oxide, tetraalkyltin such as dibutyltin dilaurate, dialkyltin oxide hydroxide such as butyltin oxide hydroxide, aluminum alkoxides, alkyl zinc, dialkyl zinc, zinc oxide, stannous oxide, or mixtures thereof; and which catalysts are selected in amounts of, for example, from about 0.01 mole percent to about 5 mole percent based on the starting diacid or diester used to generate the polyester resin.

Additional examples of crystalline polymer materials include other polyesters, polyamides, polyimides, polyolefins, polyethylene, polybutylene, polyisobutyrate, ethylene-propylene copolymers, ethylene-vinyl acetate copolymers, polypropylene, mixtures thereof, and the like. Specific examples include poly(ethylene-adipate), poly(propylene-adipate), poly(butylene-adipate), poly(pentylene-adipate), poly(hexylene-adipate), poly(octylene-adipate), poly(ethylene-succinate), poly(propylene-succinate), poly(butylene-succinate), poly(pentylene-succinate), poly(hexylene-succinate), poly(octylene-succinate), poly(ethylene-sebacate), poly(propylene-sebacate), poly(butylene-sebacate), poly(pentylene-sebacate), poly(hexylene-sebacate), poly(octylene-sebacate), alkali copoly(5-sulfoisophthaloyl)-copoly(ethylene-adipate), alkali copoly(5-sulfoisophthaloyl)-copoly(propylene-adipate), alkali copoly(5-sulfoisophthaloyl)-copoly(butylene-adipate), alkali copoly(5-sulfo-isophthaloyl)-copoly(pentylene-adipate), alkali copoly(5-sulfo-isophthaloyl)-copoly(hexylene-adipate), alkali copoly(5-sulfo-isophthaloyl)-copoly(octylene-adipate), alkali copoly(5-sulfo-isophthaloyl)-copoly(ethylene-adipate), alkali copoly(5-sulfo-isophthaloyl)-copoly (propylene-adipate), alkali copoly(5-sulfo-isophthaloyl)-copoly(butylene-adipate), alkali copoly(5-sulfo-isophthaloyl)-copoly(pentylene-adipate), alkali copoly(5-sulfo-isophthaloyl)-copoly(hexylene-adipate), alkali copoly(5-sulfo-isophthaloyl)-copoly(octylene-adipate), alkali copoly(5-sulfoisophthaloyl)-copoly(ethylene-succinate), alkali copoly(5-sulfoisophthaloyl)-copoly(propylene-succinate), alkali copoly(5-sulfoisophthaloyl)-copoly(butylenes-succinate), alkali copoly(5-sulfoisophthaloyl)-copoly(pentylene-succinate), alkali copoly(5-sulfoisophthaloyl)-copoly(hexylene-succinate), alkali copoly(5-sulfoisophthaloyl)-copoly(octylene-succinate), alkali copoly(5-sulfo-isophthaloyl)-copoly(ethylene-sebacate), alkali copoly(5-sulfo-isophthaloyl)-copoly(propylene-sebacate), alkali copoly(5-sulfo-isophthaloyl)-copoly(butylene-sebacate), alkali copoly(5-sulfo-isophthaloyl)-copoly(pentylene-sebacate), alkali copoly(5-sulfo-isophthaloyl)-copoly(hexylene-sebacate), alkali copoly(5-sulfo-isophthaloyl)-copoly(octylene-sebacate), alkali copoly(5-sulfo-isophthaloyl)-copoly(ethylene-adipate), alkali copoly(5-sulfo-isophthaloyl)-copoly(propylene-adipate), alkali copoly(5-sulfo-isophthaloyl)-copoly(butylene-adipate), alkali copoly(5-sulfo-isophthaloyl)-copoly(pentylene-adipate), alkali copoly(5-sulfo-isophthaloyl)-copoly(hexylene-adipate), poly(octylene-adipate), and wherein alkali is a metal like sodium, lithium or potassium. Examples of polyamides include poly(ethylene-adipamide), poly(propylene-adipamide), poly(butylenes-adipamide), poly(pentylene-adipamide), poly(hexylene-adipamide), poly(octylene-adipamide), poly(ethylene-succinamide), and poly(propylene-sebecamide). Examples of polyimides include poly(ethylene-adipimide), poly(propylene-adipimide), poly(butylene-adipimide), poly(pentylene-adipimide), poly(hexylene-adipimide), poly(octylene-adipimide), poly(ethylene-succinimide), poly(propylene-succinimide), and poly(butylene-succinimide), The crystalline material in the toner may have a melting temperature of, for example, from about 30° C. to about 12° C., such as from about 50° C. to about 90° C., and a recrystallization temperature of at least about 40° C., such as a recrystallization temperature of, for example, from about 50° C. to about 65° C. In embodiments, the crystalline resin is a sulfonated polyester resin. The crystalline resin may be sulfonated from about 0.5 weight percent to about 4.5 weight percent, such as from about 1.5 weight percent to about 4.0 weight percent, of the crystalline polyester. The crystalline material may possess, for example, a number average molecular weight (Mn), as measured by gel permeation chromatography (GPC) of, for example, from about 1,000 to about 250,000, and preferably from about 2,000 to about 50,000 and a weight average molecular weight (Mw) of, for example, from about 1,000 to about 250,000, such as from about 2,000 to about 100,000, as determined by GPC using polystyrene standards. The molecular weight distribution (Mw/Mn) of the crystalline material may be, for example, from about 2 to about 6, and more specifically, from about 2 to about 4.

The crystalline polymer material is, for example, present in an amount of from about 5 to about 50 percent by weight of the binder, such as from about 5 to about 25 percent by weight or from about 10 to about 25% by weight, of the binder.

In addition to the binder, the toner may also include at least one colorant and/or at least one wax. Colorant includes pigment, dye, mixtures of dyes, mixtures of pigments, mixtures of dyes and pigments, and the like.

When present, the colorant may be added in an effective amount of, for example, from about 1 to about 25 percent by weight of the toner, such as in an amount of from about 2 to about 12 weight percent of the toner. Suitable example colorants include, for example, carbon black like REGAL 330® magnetites, such as Mobay magnetites MO8029™, MO8060™; Columbian magnetites; MAPICO BLACKS™ and surface treated magnetites; Pfizer magnetites CB4799™, CB5300™, CB5600™, MCX6369™; Bayer magnetites, BAYFERROX 8600™, 8610™; Northern Pigments magnetites, NP-604™, NP-608™; Magnox magnetites TMB-100™, or TMB-104™; and the like. As colored pigments, there may be selected cyan, magenta, yellow, red, green, brown, blue or mixtures thereof. Specific examples of pigments include phthalocyanine HELIOGEN BLUE L6900™, D6840™, D7080™, D7020™, PYLAM OIL BLUE™, PYLAM OIL YELLOW™, PIGMENT BLUE 1™ available from Paul Uhlich & Company, Inc., PIGMENT VIOLET 1™, PIGMENT RED 48™, LEMON CHROME YELLOW DCC 1026™, E.D. TOLUIDINE RED™ and BON RED C™ available from Dominion Color Corporation, Ltd., Toronto, Ontario, NOVAPERM YELLOW FGL™, HOSTAPERM PINK E™ from Hoechst, and CINQUASIA MAGENTA™ available from E.I. DuPont de Nemours & Company, and the like. Generally, colorants that can be selected are black, cyan, magenta, or yellow, and mixtures thereof. Examples of magentas are 2,9-dimethyl-substituted quinacridone and anthraquinone dye identified in the Color Index as CI 60710, CI Dispersed Red 15, diazo dye identified in the Color Index as CI 26050, CI Solvent Red 19, and the like, Illustrative examples of cyans include copper tetra(octadecyl sulfonamido)phthalocyanine, x-copper phthalocyanine pigment listed in the Color Index as CI 74160, CI Pigment Blue, and Anthrathrene Blue, identified in the Color Index as CI 69810, Special Blue X-2137, and the like; while illustrative examples of yellows are diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33 2,5-dimethoxy-4-sulfonanilide phenylazo-4'-chloro-2,5-dimethoxy acetoacetanilide, and Permanent Yellow FGL. Colored magnetites, such as mixtures of MAPICO BLACK™, and cyan components may also be selected as colorants. Other known colorants can be selected, such as Levanyl Black A-SF (Miles, Bayer) and Sunsperse Carbon Black LHD 9303 (Sun Chemicals), and colored dyes such as Neopen Blue (BASF), Sudan Blue OS (BASF), PV Fast Blue B2G01 (American Hoechst), Sunsperse Blue BHD 6000 (Sun Chemicals), Irgalite Blue BCA (Ciba-Geigy), Paliogen Blue 6470 (BASF), Sudan III (Matheson, Coleman, Bell), Sudan II (Matheson, Coleman, Bell), Sudan IV (Matheson, Coleman, Bell), Sudan Orange G (Aldrich), Sudan Orange 220 (BASF), Paliogen Orange 3040 (BASF), Ortho Orange OR 2673 (Paul Uhlich), Paliogen Yellow 152, 1560 (BASF), Lithol Fast Yellow 0991K (BASF), Paliotol Yellow 1840 (BASF), Neopen Yellow (BASF), Novoperm Yellow FG 1 (Hoechst), Permanent Yellow YE 0305 (Paul Uhlich), Lumogen Yellow D0790 (BASF), Sunsperse Yellow YHD 6001 (Sun Chemicals), Suco-Gelb L1250 (BASF), Suco-Yellow D1355 (BASF), Hostaperm Pink E (American Hoechst), Fanal Pink D4830 (BASF), Cinquasia Magenta (DuPont), Lithol Scarlet D3700 (BASF), Toluidine Red (Aldrich), Scarlet for Thermoplast NSD PS PA (Ugine Kuhlmann of Canada), E.D. Toluidine Red (Aldrich), Lithol Rubine Toner (Paul Uhlich), Lithol Scarlet 4440 (BASF), Bon Red C (Dominion Color Company), Royal Brilliant Red RD-8192 (Paul Uhlich), Oracet Pink RF (Ciba-Geigy), Paliogen Red 3871K (BASF), Paliogen Red 3340 (BASF), and Lithol Fast Scarlet L4300 (BASF).

Optionally, a wax may be present in an amount of from about 1 to about 30% by weight of the toner, such as from about 1 to about 15% by weight of the toner. The wax may function as, for example, a release agent to assist in the release of toner images from a fuser roll. Examples of waxes are known, and include, for example, alkylenes, such as polypropylene, polyethylene, and the like. The waxes may be hydrophobic and essentially water insoluble. The wax may include (1) natural waxes such as those extracted from vegetables (carnauba wax, Japan wax, bayberry wax) or animals (beeswax, shellac wax, spermaceti wax); (2) mineral waxes, such as those extracted, for example, from bituminous lignite or share (montan wax, ozokerite wax, ceresin wax); (3) petroleum waxes, complex mixtures of paraffinic hydrocarbons obtained from the distillation of crude petroleum (paraffin wax), or by dewaxing heavy lubricating oils and petrolatum residues (microcrystalline wax); and (4) synthetic waxes generated, for example, by chemical processes including petroleum, Fischer-Tropsch (by coal gasification), polyethylene, polypropylene, acrylate, fatty acid amides, silicone and polytetrafluoroethylene waxes. Specific examples of waxes for use herein include polypropylenes and polyethylenes such as commercially available from Allied Chemical and Petrolite Corporation (for example, the POLYWAX™ line of waxes), wax emulsions available from Michaelman, Inc. and the Daniels Products Company, EPOLENE N-15™ commercially available from Eastman Chemical Products, Inc., VISCOL 550-P™, a low weight average molecular weight polypropylene available from Sanyo Kasei K. K., and similar materials. Additional examples of suitable waxes include natural waxes such as carnauba wax, functionalized waxes such as amines, amides, for example AQUA SUPERSLIP 6550™, SUPERSLIP 6530™ available from Micro Powder Inc., fluorinated waxes, for example POLYFLUO 190™, POLYFLUO 200™, POLYSILK 19™, POLYSILK 14™ available from Micro Powder Inc., mixed fluorinated, amide waxes, for example MICROSPERSION 19™ also available from Micro is Powder Inc., imides, esters, quaternary amines, carboxylic acids or acrylic polymer emulsion, for example JONCRYL™ waxes, all available from SC Johnson Wax, chlorinated polypropylenes and polyethylenes available from Allied Chemical and Petrolite Corporation and SC Johnson Wax, and the like. Mixtures of waxes may also be used.

The toners may also include any additional additives, such as charge enhancing agents, embrittling agents, flow agents such as colloidal silica, external surface additives such as silica and/or titania, and the like, as desired or necessary.

The emulsion aggregation toner has advantages in achieving a small sized toner particle with a substantially uniform particle size distribution. For example, the toner particles may have an average particle size of from about 3 to about 25 µm, such as from about 5 to about 15 µm or from about 5 to about 12 µm, as determined by use of a Coulter Counter or similar device. The volume average and number average geometric size distribution (GSDv and GSDn) of the toner particles of embodiments maybe in a range of from about 1.1 to about 1.3, as measured with a suitable process such as Coulter Counter Multisizer II. The volume average and the number average distribution, respectively, are determined based on the particle diameters at which a cumulative percentage of particles are attained. In this regard, the particle diameters at which a cumulative percentage of 16 percent are attained are defined as volume D16 percent and number D16 percent, respectively, and the particle diameters at which a cumulative percentage of 84 percent are attained are defined as volume D84 percent and number D84 percent, respectively. These aforementioned volume average particle size distribution index GSDv and number average particle size distribution index GSDn can be expressed by using D16 percent and D84 percent in cumulative distribution, wherein the volume average particle size distribution index GSDv is expressed as (volume D84 percent/volume D16 percent)$^{1/2}$ and the number average particle size distribution index GSDn is expressed as (number D84 percent/number D16 percent)$^{1/2}$.

The toner may be made by melt mixing the ingredients together in a mixing device. Examples of mixing devices are twin screw extruders, Banbury/rollmill, kneaders, and the like.

The toner particles may also be made by chemical processes such as by emulsion aggregation. Any suitable emulsion aggregation procedure may be used in forming the emulsion aggregation toner particles without restriction. These procedures typically include the basic process steps of at least aggregating an emulsion containing the binder components, one or more colorants, optionally one or more surfactants, optionally one or more waxes, optionally a coagulant and one or more additional optional additives to form aggregates, subsequently coalescing the aggregates, and then recovering, optionally washing and optionally drying the obtained emulsion aggregation toner particles.

An example emulsion aggregation procedure may comprise providing a latex or emulsion of the binder components, any wax, any colorant, and any other desired or required additives. In embodiments, the amorphous and crystalline polyesters may be formed in different emulsions and mixed together in a pre-toner mixture prior to aggregation. The pH of the pre-toner mixture may be adjusted to between about 4 to about 5. The pH of the pre-toner mixture may be adjusted by an acid such as, for example, acetic acid, nitric acid or the like. Additionally, in embodiments, the pre-toner mixture optionally maybe homogenized by mixing at about 600 to about 4,000 revolutions per minute. The particles may then be aggregated, for example through addition of an aggregating agent or coagulant to the emulsion. The aggregating agent is generally an aqueous solution of a divalent cation or a multivalent cation material. The aggregating agent may be, for example, polyaluminum halides such as polyaluminum chloride (PAC), or the corresponding bromide, fluoride, or iodide, polyaluminum silicates such as polyaluminum sulfosilicate (PASS), and water soluble metal salts including aluminum chloride, aluminum nitrite, aluminum sulfate, potassium aluminum sulfate, calcium acetate, calcium chloride, calcium nitrite, calcium oxylate, calcium sulfate, magnesium acetate, magnesium nitrate, magnesium sulfate, zinc acetate, zinc nitrate, zinc sulfate, zinc chloride, zinc bromide, magnesium bromide, copper chloride, copper sulfate, and combinations thereof. Aggregation may be accomplished at temperatures greater than about 60° C. Following aggregation to the desired particle size, the aggregates may be coalesced. Coalescence may be accomplished by heating the aggregate mixture to a temperature that is about 5 to about 20° C. above the Tg of the binder. Generally, the aggregated mixture is heated to a temperature of about 50 to about 80° C. In embodiments, coalescence is accomplished by also stirring the mixture at a temperature of from about 200 to about 750 revolutions per minute. Optionally, during coalescence, the particle size of the toner particles may be controlled and adjusted to a desired size by adjusting the pH of the mixture. Generally, to control the particle size, the pH of the mixture is adjusted to between about 5 to about 7 using a base such as, for example, sodium hydroxide. After coalescence, the mixture is cooled to room temperature. After cooling, the mixture of toner particles is washed with water and then dried. Drying may be accomplished by any suitable method for drying including freeze drying.

The process may or may not include the use of surfactants. If used, the surfactants may be anionic, cationic or nonionic. Anionic surfactants include sodium dodecylsulfate (SDS), sodium dodecyl benzene sulfonate, sodium dodecylnaphthalene sulfate, dialkyl benzenealkyl, sulfates and sulfonates, abitic acid, and the NEOGEN brand of anionic surfactants available from Daiichi Kogyo Seiyaku Co. Ltd. Examples of cationic surfactants include dialkyl benzene alkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, $C_{12}$, $C_{15}$, $C_{17}$ trimethyl ammonium bromides, halide salts of quaternized polyoxyethylalkylamines, dodecyl benzyl triethyl ammonium chloride, MIRAPOL and ALKAQUAT available from Alkaril Chemical Company, SANISOL (benzalkonium chloride), available from Kao Chemicals, and the like. Examples of nonionic surfactants include polyvinyl alcohol, polyacrylic acid, methalose, methyl cellulose, ethyl cellulose, propyl cellulose, hydroxy ethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxy poly(ethyleneoxy) ethanol, available from Rhone-Poulenc Inc. as IGEPAL CA-210, IGEPAL CA-520, IGEPAL CA-720, IGEPAL CO-890, IGEPAL CO-720, IGEPAL CO-290, IGEPAL CA-210, ANTAROX 890 and ANTAROX 897.

Following formation of the toner particles, external additives may be added to the toner particle surface by any suitable procedure such as those well known in the art. For example, suitable surface additives that may be used are one or more of $SiO_2$, metal oxides such as, for example, $TiO_2$ and aluminum oxide, and a lubricating agent such as, for example, a metal salt of a fatty acid (for example, zinc stearate (ZnSt), calcium stearate) or long chain alcohols such as UNILIN 700. $SiO_2$ and $TiO_2$ may be surface treated with compounds including DTMS (dodecyltrimethoxysilane) or HMDS (hexamethyldisilazane). Examples of these additives are a silica coated with a mixture of HMDS and aminopropyltriethoxysilane; a silica coated with PDMS (polydimethylsiloxane); a silica coated with octamethylcyclotetrasiloxane; a silica coated with dimethyldichlorosilane; DTMS silica, obtained from Cabot Corporation, comprised of a fumed silica, for example silicon dioxide core L90 coated with DTMS; silica coated with an amino functionalized organopolysiloxane; X24 sol-gel silica available from Shin-Etsu Chemical Co., Ltd.; TS530 from Cabot Corporation, Cab-O-Sil Division, a treated fumed silica; titania comprised of a crystalline titanium dioxide core coated with DTMS; and nia comprised of a crystalline titanium dioxide core coated with DTMS. The titania may also be untreated, for example P-25 from Nippon Aerosil Co., Ltd. Zinc stearate may also be used as an external additive, the zinc stearate providing lubricating properties. Zinc stearate provides developer conductivity and tribo enhancement, both due to its lubricating nature. In addition, zinc stearate can enable higher toner charge and charge stability by increasing the number of contacts between toner and carrier particles. Calcium stearate and magnesium stearate provide similar functions. Most preferred is a commercially available zinc stearate known as ZINC STEARATE L, obtained from Ferro Corporation.

The toners are sufficient for use in an electrostatographic or xerographic process. In this regard, the toner particles may be formulated into a developer composition, optionally by mixing with carrier particles. The toner concentration in each developer may range from, for example, about 1 to about 25%, such as from about 2 to about 15%, by weight of the total weight of the developer. Illustrative examples of carrier particles that can be selected for mixing with the toner include those particles that are capable of triboelectrically obtaining a charge of opposite polarity to that of the toner particles. Illustrative examples of suitable carrier particles include granular zircon, granular silicon, glass, steel, nickel, ferrites, iron ferrites, silicon dioxide, and the like. Additionally, there can be selected as carrier particles nickel berry carriers, comprised of nodular carrier beads of nickel, characterized by surfaces of reoccurring recesses and protrusions thereby providing particles with a relatively large external area. The carrier particles may be used with or without a coating, the coating generally being comprised of fluoropolymers, such as polyvinylidene fluoride resins, terpolymers of styrene, methyl methacrylate, a silane, such as triethoxy silane, tetrafluoroethylenes, other known coatings and the like. The carrier core may be at least partially coated with a polymethyl methacrylate (PMMA) polymer. PMMA is an electropositive polymer that will generally impart a negative charge on the toner by contact. The coating has, in embodiments, a coating weight of from about 0.1 weight percent to about 5.0 weight percent, or from about 0.5 weight percent to about 2.0 weight percent of the carrier. The carrier particles may be prepared by mixing the carrier core with from about 0.05 weight percent to about 10 weight percent of polymer, such as from about 0.05 weight percent to about 3 weight percent of polymer, based on the weight of the coated carrier particles, until the polymer coating adheres to the carrier core by mechanical impaction and/or electrostatic attraction. Various effective suitable means can be used to apply the polymer to the surface of the carrier core particles, for example, cascade-roll mixing, tumbling, milling, shaking, electrostatic powder-cloud spraying, fluidized bed, electrostatic disc processing, and with an electrostatic curtain. The mixture of carrier core particles and polymer may then be heated to melt and fuse the polymer to the carrier core particles. The coated carrier particles are then cooled and classified to a desired particle size.

Carrier particles can be mixed with toner particles in any suitable combination in embodiments. In some embodiments, for example, about 1 to about 5 parts by weight of toner particles are mixed with from about 10 to about 300 parts by weight of the earner particles.

In embodiments, any known type of image development system may be used in an image developing device, including, for example, magnetic brush development, jumping single-component development, hybrid scavengeless development (HSD), etc. These development systems are well known in the art, and further explanation of the operation of these devices to form an image is thus not necessary herein. The toners are included in a housing of the device, and provided from the housing to an image development station of the device in forming an image. Once the image is formed with toners/developers via a suitable image development method such as any one of the aforementioned methods, the image is then transferred to an image receiving medium such as paper and the like. The device may include a fuser roll member. Fuser roll members are contact fusing devices that are well known in the art, in which heat and pressure from the roll are used in order to fuse the toner to the image-receiving medium. Typically, the fuser member may be heated to a temperature just above the fusing temperature of the toner.

Toner compositions and processes for producing such toners according to the described embodiments are further illustrated by the following examples.

Toner Particle Preparation

General Procedure for Preparation of Emulsion 816.67 g of ethyl acetate was added to 125 g of amorphous resin of poly(propoxylated bisphenol A fumarate), or crystalline resin derived from butanediol, hexanediol and fumaric acid. The resin was dissolved by heating to 65° C. on a hot plate and stirring at about 200 rpm. After dissolving the resin, an appropriate amount of material, for example 3.05 g (for an acid number of about 17) of sodium bicarbonate, was measured into a 4 L glass reactor vessel. 708.33 g of deionized water was added to the reactor vessel. The base water solution was heated to 65° C. on a hot plate stirring at about 200 rpm. The base water solution was homogenized starting at 4,000 rpm. The dissolved resin ethyl acetate mixture was slowly poured into the base water solution as it was being homogenized at 4,000 rpm. The homogenizer speed was increased to 10,000 rpm and left for 30 minutes. The homogenized mixture was placed in a heat jacketed Pyrex distillation apparatus, with stirring at about 200 rpm. The temperature was ramped up to 80° C. at about 1° C./minute. The ethyl acetate was distilled from the mixture at 80° C. for 120 minutes. The mixture was cooled to below 40° C. then screened through a 20 micron screen. The mixture was pH adjusted to 7.0 using 4% NaOH solution and centrifuged.

General Procedure for Toner Preparation (Cyan)

A 2 Liter kettle is charged with the polyester emulsion(s) above and diluted to about 10% solids with water. Cyan pigment dispersion (4.5% by weight of toner) was added slowly to the above slurry while homogenizing at 2000 rpm. To this is then added 60 to 70 grams of 0.3 N nitric acid solution, and the homogenizer was increased to 4500 rpm at the end of the nitric acid addition. The pH of the mixture is usually in the range 2.8 to 3.4. The mixture is then stirred at 150 to 200 rpm with an overhead stirrer and placed in a heating mantle. The temperature is increased a range of 42 to 47° C. over a 4 hour period, during which the particles grow to a range of 7.5 to 8.5 µm. To this is then added 4.5 grams of Tayca Power (17.5% solution), followed by the addition of 4% sodium hydroxide until the pH of the mixture is about 6.8 to 7. During this latter addition, the stirrer speed is reduced to 70 rpm. The mixture is then heated to 63-66° C. over 60 minutes, after which the pH is decreased to 6 to 6.1 with 0.3 N $HNO_3$ solution until the particles are spheroidized.

The following toners were prepared:

| Toner | Amorphous resin acid number | Crystalline resin acid number | Ratio of Amorphous/ Crystalline | Q/M C-Zone 5' | Q/M C-Zone 60' | Q/M A-zone 5' | Q/M A-zone 60' | Particle Size $D_{50}$ ($GSD_v/GSD_n$) |
|---|---|---|---|---|---|---|---|---|
| 1 | 16.7 |  | 100:0 | −49.5 | −44.1 | −11.1 | −11.1 | 8.06 (1.22/1.22) |
| 2 | 16.7 | 13 | 85:15 | −34.9 | −37.3 | −4.1 | −4.4 | 8.77 (1.23/1.25) |
| 3 | 20.3 |  | 100:0 | −53.7 | −49.8 | −11.8 | −12.3 | 8.50 (1.25/1.26) |
| 4 | 20.3 | 13 | 85:15 | −54.9 | −46.5 | −11.1 | −12.2 | 7.82 (1.23/1.25) |

Toners 2 and 4 were example toners, and toners 1 and 3 were comparative example toners.

Toner Charging Evaluation

Developers for bench charging evaluations were prepared by using 100 g of 65 micron PMMA coated iron carrier and 4.5 g of toner. The developer toner concentration is 4.5 parts per hundred. Two developers are prepared and conditioned in two chambers with different zone conditions, the A-zone chamber has a temperature and RH settings of 28° C. and 85% RH and the C-zone chamber has a temperature and RH settings of 12° C. and 15% RH. Developer charging is done in two steps, a short 5 minutes and a long 60 minutes paint shaking time. Desirably, developer reaches stable charge at a short time and maintains this level with minimal change with increasing charging time.

Toners 2 and 4 provide ultra low melt properties. Toners 1 and 3 were prepared with only an amorphous polyester resin, no crystalline polyester. The toner provides very smooth circular particles, which are very desirable to provide a uniform surface on which to blend surface additives. The resin acid number was 16.7 for one toner (toner 1). On addition of a crystalline polyester resin with a lower acid number of 13.2 (toner 2), there is evidence of some crystalline polyester crystallites on and near the surface forming irregular protrusions, although the amount of crystallites near the surface is still an acceptable amount. A toner (toner 3) was also made with a higher acid number amorphous polyester resin of 20.3. Again, the toner was very smooth. Adding 15% of the same crystalline polyester resin to the amorphous polyester resin with higher acid value (toner 4) shows no evidence of any surface or near surface crystalline resin, and the particles are very smooth. Thus, when the acid number of the amorphous resin is higher than the acid number of the crystalline resin, the greater the difference in acid number, the less crystalline material on the surface and the more smooth and uniform the surface.

Charging performance for the four toners also showed benefit for the acid number of the amorphous resin being above that of the crystalline resin. In both C-zone and A-zone, the parent toner charge drops when crystalline polyester is added to the amorphous polyester resin (toner 2 vs. toner 1), although the drop is advantageously lower as when there is no difference in acid numbers between the amorphous and crystalline resins. When the acid number of the amorphous resin is 20.3 (toner 4 vs. toner 3), there is no drop in charge on addition of the crystalline resin. Thus, by increasing the amorphous resin acid number, it is possible to minimize the effect of the addition of crystalline resin. In this way, an ultra low melt parent toner can be made with higher C-zone and higher A-zone charge than current toner. If the amorphous resin acid number is greater than the crystalline polyester resin acid number, the bigger the acid number difference, the better the performance.

If, on the other hand, the amorphous resin is lower in acid number than the crystalline polyester resin, it is very difficult to make good emulsion aggregation toner particles. Desirably, the amorphous resin has an acid number above about 13 in order to be able to make emulsion aggregation toner particles using the amorphous resin. Further, the acid number of the amorphous resin is desirably greater than the acid number of the crystalline resin, the greater the difference the better.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

What is claimed is:

1. A toner comprised of binder comprising amorphous polymer material and crystalline polymer material, wherein the amorphous polymer material has an acid number that is greater than an acid number of the crystalline polymer material, and wherein the acid number of the amorphous polymer material is from about 13 to about 30.

2. The toner according to claim 1, wherein the acid number of the amorphous polymer material is greater than the acid number of the crystalline polymer material by a value of 3 or more.

3. The toner according to claim 1, wherein the acid number of the amorphous polymer material is greater than the acid number of the crystalline polymer material by a value of 6 or more.

4. The toner according to claim 1, wherein the acid number of the amorphous polymer material is from about 16 to about 30.

5. The toner according to claim 1, wherein the amorphous polymer material is an amorphous polyester material and the crystalline polymer material is a crystalline polyester material.

6. The toner according to claim 1, wherein the toner is an emulsion aggregation toner.

7. The toner according to claim 1, wherein the amorphous polymer material has acid terminated chains.

8. The toner according to claim 1, wherein the crystalline polymer material has acid terminated chains.

9. The toner according to claim 1, wherein the amorphous polymer material is derived from reaction of at least an organic alcohol selected from the group consisting of propylene glycol, ethylene glycol, diethylene glycd, neopentyl glycol, dipropylene glycol, dibromoneopentyl glycol, alkoxylated bisphenol A diols, 2,2,4-trimethylpentane-1,3-diol, tetrabromo bisphenol dipropoxy ether, 1,4-butanediol, and mixtures thereof, and an acid selected from the group consisting of succinic acid, glutaric acid, adipic acid, pimelic acid, suberic acid, azelaic acid, sebacic acid, isophthalic acid, terephthalic acid, hexachloroendo methylene tetrahydrophthalic acid, maleic acid, fumaric acid, chloromaleic acid, methacrylic acid, acrylic acid, itaconic acid, citraconic acid, mesaconic acid, maleic anhydride, phthalic anhydride, chlorendic anhydride, tetrahydrophthalic anhydride, hexahydrophthalic anhydride, endomethylene tetrahydrophthalic anhydride, tewachlorophthalic anhydride, tetrabromophthalic anhydride, and mixtures thereof.

10. The toner according to claim 1, wherein the crystalline polymer material is derived from reaction of at least an alcohol component comprising 80% by mole or more of an aliphatic diol having 2 to 6 carbon atoms and a carboxylic acid component comprising 80% by mole or more of an aliphatic dicarboxylic acid compound having 2 to 8 carbon atoms.

11. The toner according to claim 1, wherein the amorphous material includes crosslinked portions such that the gel content of the amorphous polymer material is from about 0.001 to about 50 weight percent of the amorphous polymer material.

12. The toner according to claim 1, wherein the toner further comprises at least one colorant comprised of a pigment, a dye, a mixture of pigments, a mixture of dyes, or a mixture of pigments and dyes.

13. The toner according to claim 1, wherein the amorphous polymer material comprises from about 50% to about 95% by weight of the binder and the crystalline polymer material comprises from about 5% and about 50% by weight of the binder.

14. The toner according to claim 1, wherein the toner has a minimum fusing temperature of from about 75° C. to about 150° C. and a relative humidity sensitivity of from about 0.5 to about 10.

15. The toner according to claim 14, wherein the toner comprises particles free of any shell resin upon the particles.

16. The toner according to claim 14, wherein the amorphous polymer material is an amorphous polyester material and the crystalline polymer material is a crystalline polyester material.

17. A method of making a toner comprised of binder comprising amorphous polymer material and crystalline polymer material, wherein the amorphous polymer material has an acid number that is greater than an acid number of the crystalline polymer material, and wherein the acid number of the amorphous polymer material is from about 13 to about 30, the method comprising forming an aqueous emulsion of the amorphous polymer material and the crystalline polymer material, and aggregating toner particles from the aqueous emulsion.

18. The method according to claim 17, wherein the method further comprises coalescing the aggregated toner particles.

19. The method according to claim 17, further comprising including at least one colorant comprised of a pigment, a dye, a mixture of pigments, a mixture of dyes, or a mixture of pigments and dyes in the aqueous emulsion.

20. The method according to claim 17, wherein the amorphous polymer material is an amorphous polyester material and the crystalline polymer material is a crystalline polyester material.

* * * * *